(12) United States Patent
Edwards

(10) Patent No.: US 7,980,357 B2
(45) Date of Patent: Jul. 19, 2011

(54) EXHAUST SILENCER FOR MICROTURBINES

(75) Inventor: Andrew J. Edwards, Redding, CT (US)

(73) Assignee: OfficePower, Inc., Norwalk, CT (US)

( * ) Notice: Subject to any disclaimer, the term of this patent is extended or adjusted under 35 U.S.C. 154(b) by 0 days.

(21) Appl. No.: 11/670,669

(22) Filed: Feb. 2, 2007

(65) Prior Publication Data

US 2008/0185219 A1 Aug. 7, 2008

(51) Int. Cl.
*F01N 1/08* (2006.01)
*F01N 1/10* (2006.01)
*F01N 1/00* (2006.01)

(52) U.S. Cl. ................... 181/264; 181/268; 181/275

(58) Field of Classification Search .......... 181/264, 181/268, 269, 270, 275, 282, 251, 224, 225, 181/226, 202, 203, 200, 256, 252
See application file for complete search history.

(56) References Cited

U.S. PATENT DOCUMENTS

| | | | | |
|---|---|---|---|---|
| 701,496 A * | 6/1902 | McKinnie | | 96/381 |
| 1,115,873 A * | 11/1914 | Spencer | | 415/119 |
| 1,511,920 A * | 10/1924 | Tregillus | | 454/214 |
| 1,673,619 A * | 6/1928 | Culp | | 137/527 |
| 1,891,170 A * | 12/1932 | Nose et al. | | 60/295 |
| 1,938,801 A * | 12/1933 | Bourne et al. | | 454/338 |
| 3,110,357 A * | 11/1963 | Jenn et al. | | 181/224 |
| 3,177,972 A * | 4/1965 | Wirt | | 181/268 |
| 4,231,221 A * | 11/1980 | Mathner et al. | | 181/240 |
| 4,345,341 A * | 8/1982 | Saito | | 4/301 |
| 4,747,467 A * | 5/1988 | Lyon et al. | | 181/218 |
| 4,786,299 A * | 11/1988 | DeMarco | | 96/382 |
| 5,196,653 A * | 3/1993 | Kiss | | 181/224 |
| 5,274,201 A * | 12/1993 | Steele | | 181/224 |
| 5,731,556 A * | 3/1998 | Gardner et al. | | 181/230 |
| 5,857,329 A * | 1/1999 | Bigham | | 181/240 |
| 5,983,888 A * | 11/1999 | Anselmino et al. | | 126/299 R |
| 6,131,696 A * | 10/2000 | Esslinger | | 181/224 |
| 6,253,873 B1 * | 7/2001 | Norres et al. | | 181/224 |
| 6,637,546 B1 * | 10/2003 | Wang | | 181/264 |
| 6,953,104 B2 * | 10/2005 | Monson et al. | | 181/224 |
| 7,444,805 B2 * | 11/2008 | Zuberi et al. | | 60/299 |
| 2005/0028516 A1 * | 2/2005 | Kiesewetter et al. | | 181/213 |
| 2009/0133957 A1 * | 5/2009 | Owens | | 181/224 |

FOREIGN PATENT DOCUMENTS

| | | | |
|---|---|---|---|
| JP | 53028209 A * | 3/1978 | |
| JP | 62162833 A * | 7/1987 | |
| JP | 01196413 A * | 8/1989 | |

* cited by examiner

*Primary Examiner* — Edgardo San Martin
(74) *Attorney, Agent, or Firm* — Fiala & Weaver P.L.L.C.

(57) ABSTRACT

Methods, systems, and apparatuses for exhaust silencers for engines, such as microturbines, are described. An exhaust silencer reduces noise produced by an engine. While passing through an exhaust silencer, an exhaust stream from the engine makes one or more turns, thereby reducing turbine noise. An exhaust silencer includes a body, a cavity in the body, a baffle plate that partially divides the central cavity, an inlet port formed in a first surface of the body, and an outlet port formed in a second surface of the body. The inlet port is configured to receive an exhaust stream that flows through the cavity, around the baffle plate. The outlet port is configured to discharge the exhaust stream from the body.

16 Claims, 6 Drawing Sheets

EXHAUST SILENCER FOR MICROTURBINES

BACKGROUND OF THE INVENTION

1. Field of the Invention

The present invention relates generally to the reduction of noise generated by turbines.

2. Background Art

Gas powered engines, such as microturbines, are used in many applications, including power generation. For example, such engines may be used to generate electricity for buildings. However, during operation, such engines may generate noise. For example, during normal operation, a turbine of a microturbine can generate a moderate amount of noise. During shutdown, a turbine may emit a loud "screech" type sound. When installed in public (e.g., urban) locations, the generated noise may be undesirable. Regulations may even exist for limiting generated noise in some localities.

Thus, what is needed are ways of reducing noise generated by engines, such as microturbines.

BRIEF SUMMARY OF THE INVENTION

Methods, systems, and apparatuses for exhaust silencers for engines, such as turbines, are described. In aspects of the present invention, an exhaust silencer reduces noise produced by a turbine or other type of engine. An exhaust stream from the turbine is passed through the exhaust silencer, making one or more turns in the exhaust silencer, thereby reducing turbine noise.

In an aspect of the present invention, an exhaust silencer is provided. The exhaust silencer includes a body, a cavity in the body, a baffle plate that partially divides the central cavity, an inlet port formed in a first surface of the body, and an outlet port formed in a second surface of the body. The inlet port is configured to receive an exhaust stream that flows through the cavity, around the baffle plate. The outlet port is configured to discharge the exhaust stream from the body.

In an example aspect, the baffle plate is positioned in the cavity to create a u-shaped compartment in the body. The u-shaped compartment includes first and second longitudinal compartments that are connected by an opening at an end of the cavity.

In another example aspect, the inlet port is positioned such that the inlet port infuses the exhaust stream into a longitudinal segment of the u-shaped compartment in a direction that is perpendicular to a flow of the exhaust stream through the longitudinal segment. Alternatively, the inlet port may be otherwise positioned.

In another example aspect, the outlet port is positioned such that the outlet port discharges the exhaust stream from a longitudinal segment of the u-shaped compartment in a direction that is perpendicular to a flow of the exhaust stream through the longitudinal segment. In an alternative aspect, the outlet port discharges the exhaust stream from the longitudinal segment in the same direction as the direction of flow of the exhaust stream through the second longitudinal segment. The outlet port may be otherwise positioned in further alternative aspects.

In another example aspect, a sound absorbing and/or heat resistant material covers at least a portion of a surface of the cavity and/or the baffle plate.

In another aspect of the present invention, a microturbine system is described. The microturbine system includes a microturbine having an exhaust port and an exhaust silencer coupled to the exhaust port. The exhaust silencer reduces noise generated by the microturbine.

In another aspect of the present invention, a method for silencing a turbine is provided. An exhaust stream is received from a turbine at an inlet port of a body. The exhaust stream flows around a baffle plate in a cavity of the body. The exhaust stream is discharged from an outlet port of the body.

In an example aspect, the exhaust stream flows along a u-shaped path through the cavity formed by the baffle plate. In another example aspect, sound generated by the turbine is absorbed with a material that lines at least a portion of a surface of the cavity.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
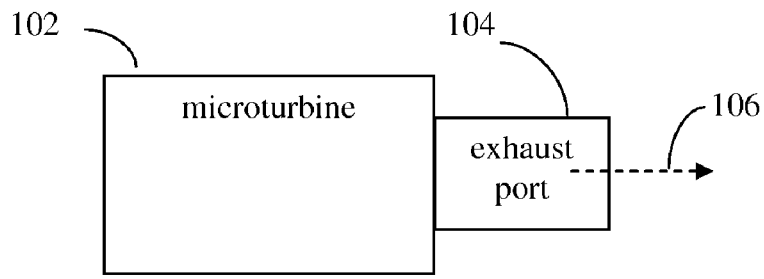
FIG. 1 shows an example microturbine system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Embodiments

Methods, systems, and apparatuses for exhaust silencers for engines such as turbines are described. In embodiments, exhaust silencers reduce noise produced by gas powered engines, such as microturbines or other types of power generating equipment. An exhaust stream of an engine is passed through an exhaust silencer. When passing through the exhaust silencer, the exhaust stream makes one or more turns, which causes a reduction in noise.

The example embodiments described herein are provided for illustrative purposes, and are not limiting. While described herein with respect to microturbines, the examples described herein may be adapted to any type of engine. Further structural and operational embodiments, including modifications/alterations, will become apparent to persons skilled in the relevant art(s) from the teachings herein.

FIG. 1 shows a conventional engine system 100. As shown in FIG. 1, system 100 includes a turbine engine shown as a microturbine 102. Microturbine 102 has an exhaust port 104. During operation, a fuel (e.g., natural gas, propane, diesel or kerosene) is mixed with air and is ignited in microturbine 102, resulting in the release of energy and in the release of exhaust gases that are discharged in an exhaust stream 106 from exhaust port 104. The released energy may be used for a variety of purposes, including distributed power and combined power and heat applications. The discharge of exhaust stream 106, however, results in unwanted noise. When installed in public (e.g., urban) locations, the generated noise may be undesirable.

Figure 2:
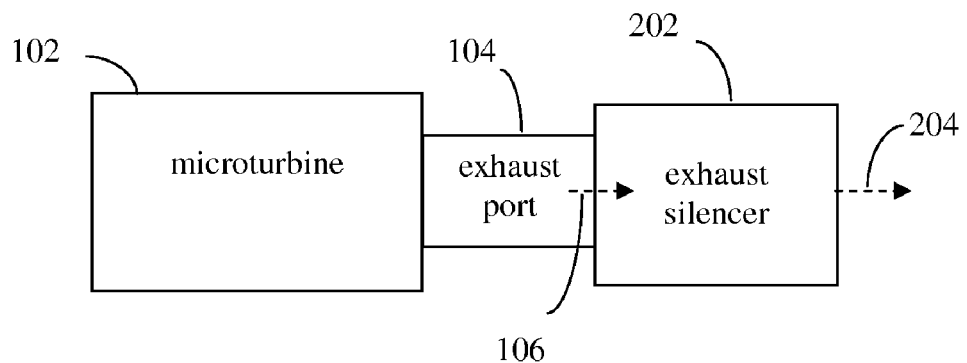
FIG. 2 shows an example microturbine system, according to an embodiment of the present invention.

FIG. 2 shows an engine system 200, according to an example embodiment of the present invention. System 200 is generally similar to system 100 shown in FIG. 100, with the addition of exhaust silencer 202. As shown in FIG. 2, exhaust silencer 202 couples with exhaust port 104 and receives exhaust stream 106. Exhaust silencer 202 reduces a noise content of exhaust stream 106. Exhaust silencer 202 discharges an exhaust stream 204, which contains less noise output for system 200 relative to system 100.

In an embodiment, exhaust silencer 202 may have an internal cavity that is formed to cause input exhaust stream 106 to make one or more turns. The one or more turns lead to a reduction of a noise content of exhaust stream 106.

Figure 3:
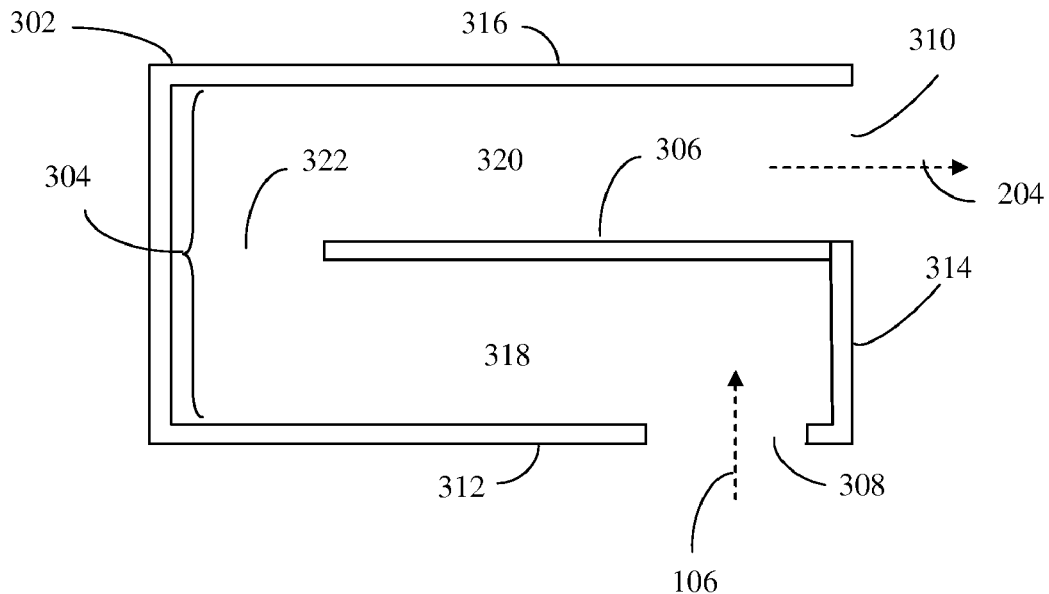
FIG. 3 shows an example exhaust silencer, according to an embodiment of the present invention.

For instance, FIG. 3 shows a cross-sectional view of an exhaust silencer 300, which is an example of exhaust silencer 202. As shown in FIG. 3, exhaust silencer 300 includes a body 302, a cavity 304 in body 302, a baffle plate 306 that partially divides cavity 304, an inlet port 308, and an outlet port 310. Inlet port 308 is formed in a first surface 312 of body 302. Outlet port 310 is formed in a second surface 314 of body. Inlet port 308 receives exhaust stream 106 from exhaust port 104 of microturbine 102. Outlet port 310 discharges exhaust stream 204.

Body 302 and baffle plate 306 may be constructed from a variety of materials, such as a metal, a combination of metals/alloy or a ceramic material. For example, in an embodiment, body 302 and/or baffle plate 306 may be made of stainless or galvanized steel (e.g., 10-gauge or 16-gauge galvanized steel). As shown in FIG. 3, baffle plate 306 partially divides cavity 304, to form first and second longitudinal compartments 318 and 320 in body 302. Inlet 308 opens to a first end of first compartment 318. An opening 322 is present between first and second compartments 318 and 320 at a second end of first compartment 318 and a first end of second compartment 320. Outlet 310 is open at a second end of second compartment 320. Thus, in the example of FIG. 3, baffle plate 306 is positioned in cavity 304 to create a u-shaped compartment (the combination of first and second compartments 318 and 320, and opening 322) in body 302, to create a u-shaped path for exhaust gas to flow through body 302.

As shown in the example of FIG. 3, first and second surfaces 312 and 314 are perpendicular surfaces to each other. In other embodiments, inlet port 308 and outlet port 310 may be located in the same surface (e.g., surface 314), in opposing surfaces (e.g., surfaces 312 and 316), or in alternative locations of body 302. Inlet port 308 and outlet port 310 are openings in body 302, and may have any shape, including circular, rectangular, etc. Furthermore, inlet port 308 may include interfacing elements to interface with a source of exhaust stream 106, including a sealing material, a seal ring, etc.

Figure 4:
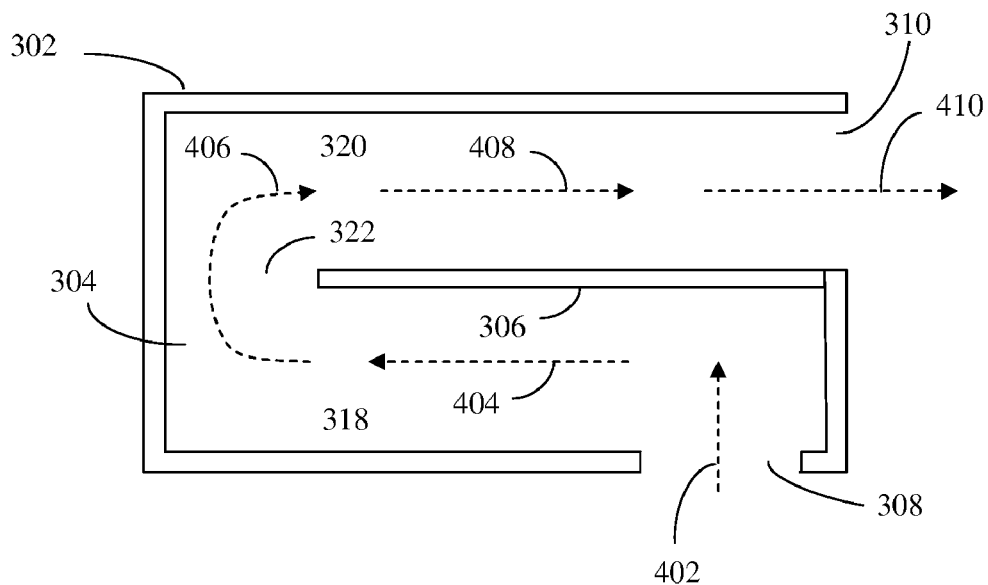
FIG. 4 shows directions of gas flow through the exhaust silencer of FIG. 3, according to an example embodiment of the present invention.

FIG. 4 shows a flow of gases through exhaust silencer 300. As shown in FIG. 4, inlet port 308 receives exhaust stream 106 (shown in FIG. 3), in a direction indicated by first arrow 402. Exhaust stream 106 flows through cavity 304 along a u-shaped path indicated by arrows 404, 406, and 408. Exhaust stream 106 passes through inlet port 308 (first arrow 402) at a first end of first compartment 318, and proceeds along the direction of second arrow 404, having made a 90 degree turn. Exhaust stream 106 flows through first compartment 318 from the first end to the second end along second arrow 404 in a direction perpendicular to first arrow 402. Exhaust stream 106 curves 180 degrees around an end of baffle plate 306 through opening 322 from first compartment 318 to second compartment 320, as indicated by third arrow 406. Exhaust stream 106 flows through second compartment 320 from the first end to the second end along fourth arrow 408 in a direction opposite to the direction of flow through first compartment 318 along second arrow 404. Exhaust stream 106 flows out of outlet port 310 as exhaust stream 204 (shown in FIG. 3) in a direction indicated by fifth arrow 410, which is the same direction as fourth arrow 408. Thus, outlet port 310 is configured to discharge exhaust stream 204 from body 302.

Thus, by flowing exhaust stream 106 around turns that are at least in part created by baffle plate 306 in cavity 304, noise present in discharged exhaust stream 204 is reduced by exhaust silencer 300. Baffle plate 306 absorbs at least some of the noise content. Baffle plate 306 may be configured to flex a desired amount to provide desired noise absorption. Although a 180 degree turn is shown in FIGS. 3 and 4 (along with a 90 degree turn from first arrow 402 to second arrow 404), further turns may be present in the exhaust silencers described herein. A turn may be 90 degrees, 180 degrees, or other angle. Furthermore, instead of a single u-shaped pattern, an s-shaped pattern (including a repeating s-shaped or undulating pattern) may be present in exhaust silencer 300, as desired in a particular application, to provide further noise absorption.

Figure 5:
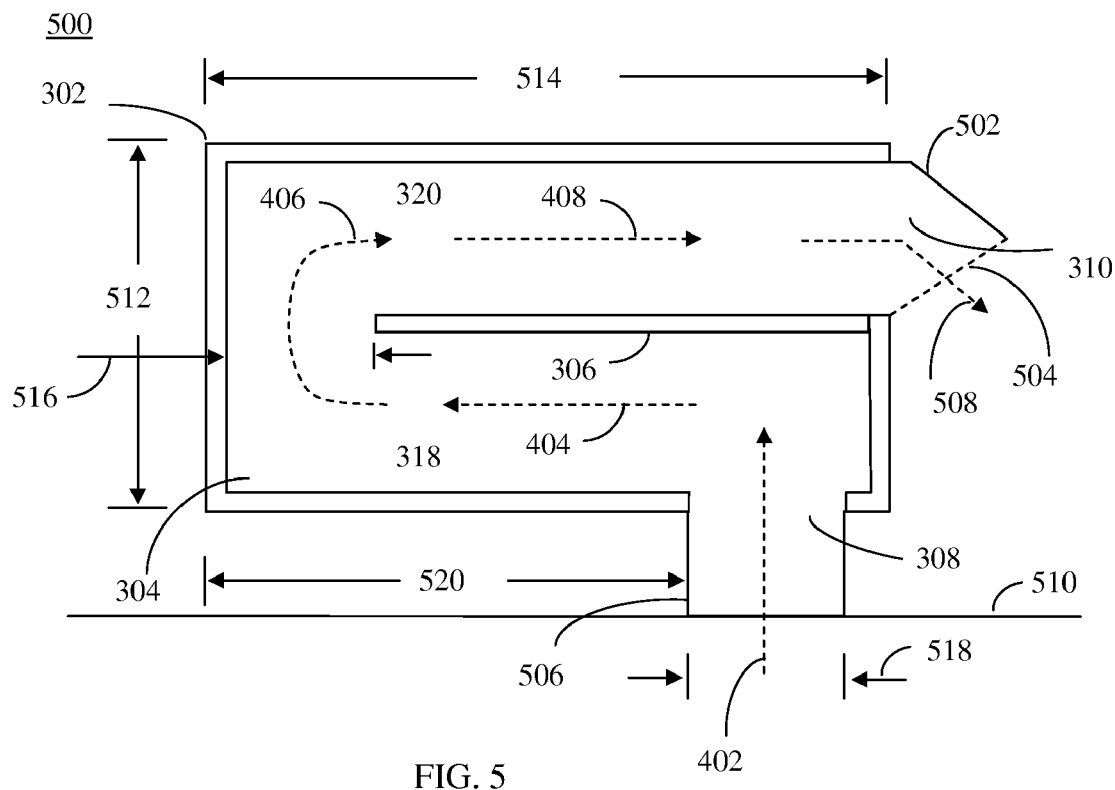
FIGS. 5 and 6 show views of an exhaust silencer, according to an embodiment of the present invention.
Figure 6:
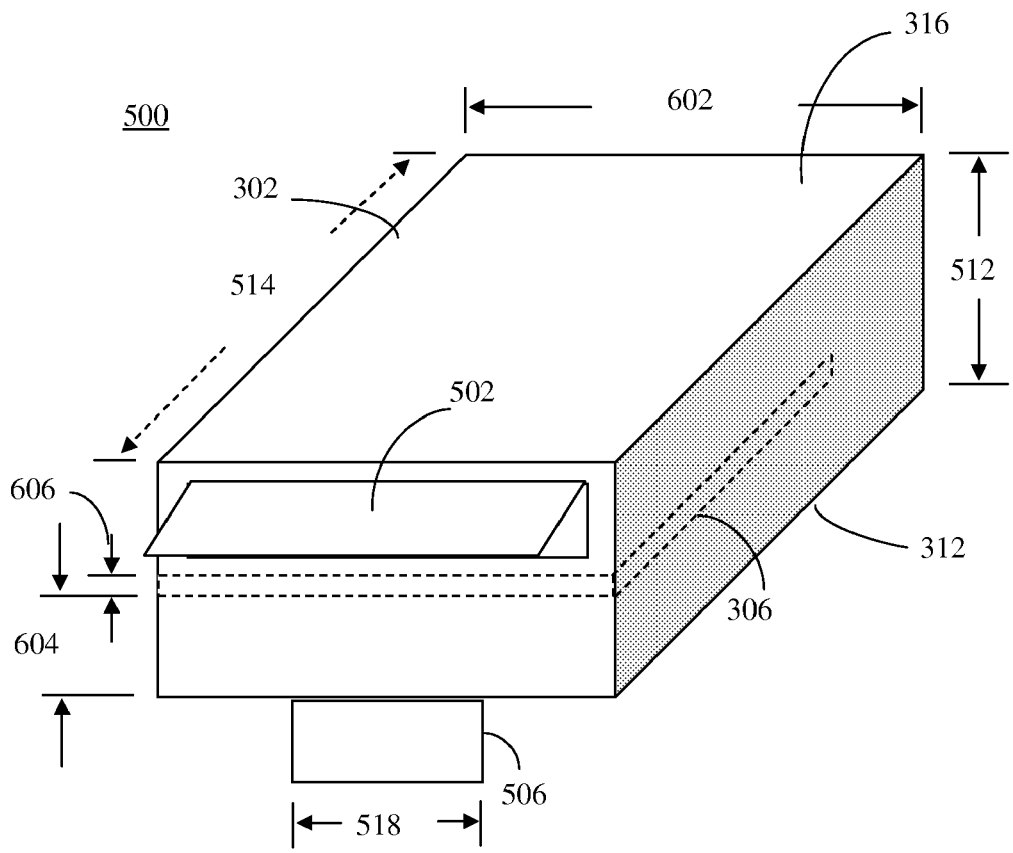

FIGS. 5 and 6 show views of an exhaust silencer 500, which is a further example of exhaust silencer 202 shown in FIG. 2, according to an embodiment of the present invention. FIG. 5 shows a cross-sectional view of exhaust silencer 500, and FIG. 6 shows a perspective view of exhaust silencer 500. Exhaust silencer 500 is similar to exhaust silencer 300 shown in FIG. 3, with the addition of a discharge hood 502, a screen 504, and a collar 506 (screen 504 and outlet port 310 are not visible in FIG. 6). Discharge hood 502 projects out from body 302 over outlet port 310 to partially cover outlet port 310. Discharge hood 502 is configured to protect outlet port 310 from environmental elements, such as rain, snow, etc. As shown in FIG. 5, an exhaust stream exiting from outlet port 310 is deflected at a slight angle downward from horizontal in a direction indicated by arrow 508. Screen 504 screens an opening between an outer edge of discharge hood 502 and a bottom edge of outlet port 310. Screen 504 further protects outlet port 310 from environmental elements, such as insects, birds, etc.

Collar 506 mounts body 302 on a surface 510. Collar 506 may provide a more convenient interface with exhaust port 104 of microturbine 102. Surface 510 may be a surface of a building, microturbine 102, a floor, or other surface or structure. Collar 506 further provides an interface between inlet port 308 and a source of exhaust stream 106, such as exhaust port 104. Collar 506 may have any suitable shape, including a hollow tube shape, etc. Collar 506 may have a circular cross-section, rectangular cross-section, or other cross-sectional shape. Collar 506 may be made of a variety of materials, including those described above for body 302 and baffle plate 306.

FIGS. 5 and 6 shows various example dimensions for exhaust silencer 500, including a height 512 of body 302, a length 514 of body 302, a width 516 of opening 322, a width 518 of inlet port 308, a distance 520 between an edge of collar 506 and an outer edge of body 302, a width 602 of body 302, a height 604 between surface 312 of body 302 and a bottom surface of baffle plate 306, and a thickness 606 of baffle plate 306. These dimensions can have a variety of values, depending on the particular application of exhaust silencer 500. For example, in an embodiment, height 512 may be 14 inches, length 514 may be 46 inches, width 516 may be 10 inches, width 518 may be 10⅛ inches, distance 520 may be 34 inches, width 602 may be 23 inches, height 604 may be 7 inches, and thickness 606 may be 1 inch. These dimensions are provided for illustrative purposes, and are not intended to be limiting.

Figure 7:
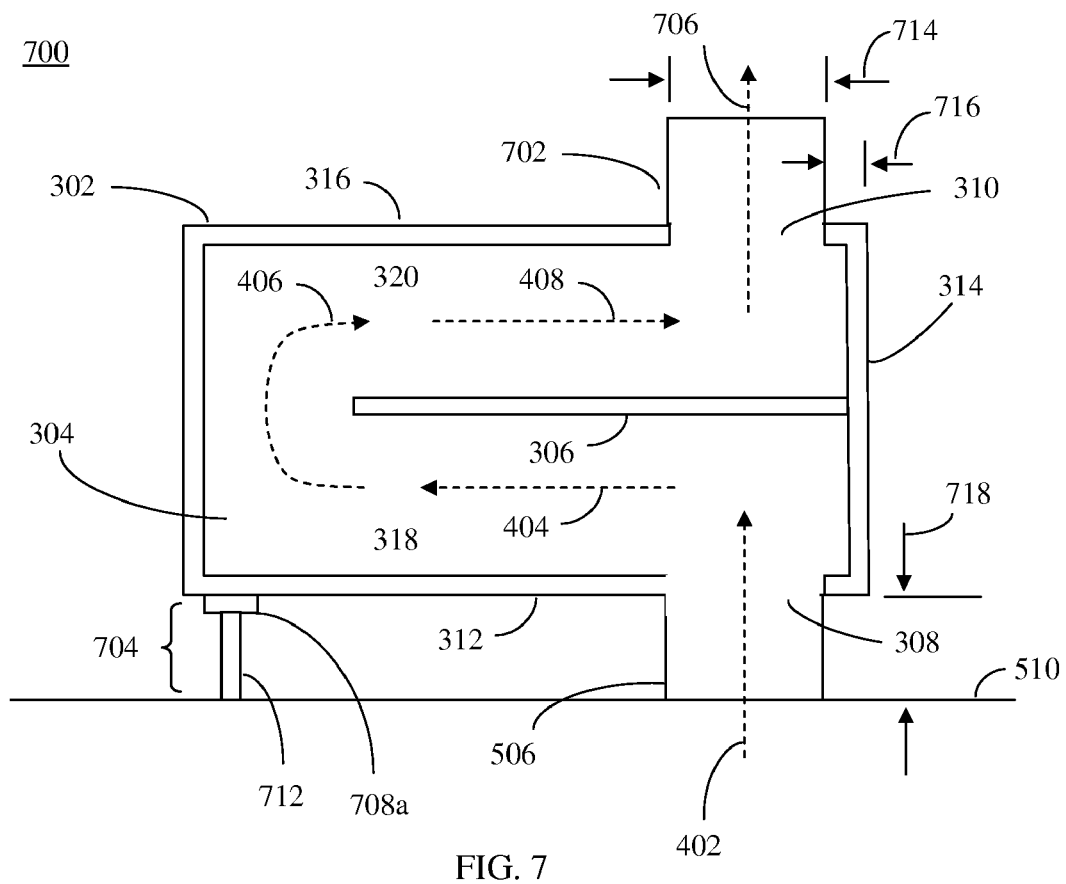
FIGS. 7 and 8 show views of another exhaust silencer, according to an embodiment of the present invention.
Figure 8:
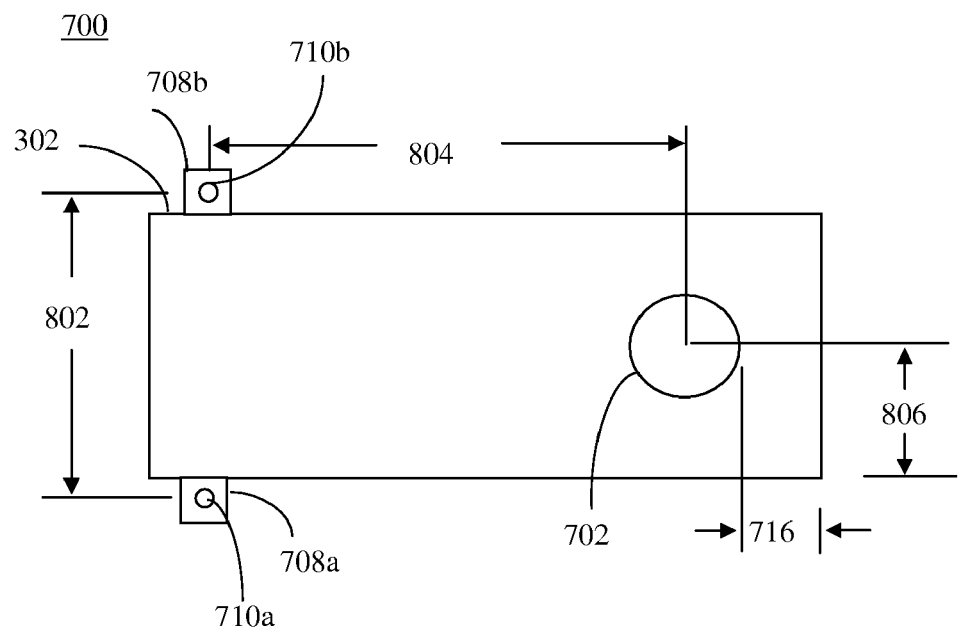

FIGS. 7 and 8 show views of an exhaust silencer 700, which is a further example of exhaust silencer 202 shown in FIG. 2, according to an embodiment of the present invention. FIG. 7 shows a cross-sectional view of exhaust silencer 700, and FIG. 8 shows a top view of exhaust silencer 700. Exhaust silencer 700 is similar to exhaust silencer 300 shown in FIG. 3, except for the configuration of outlet port 310, and the addition of a second collar 702 and a mounting assembly 704.

As shown in FIG. 7, inlet port 308 and outlet port 310 are on opposing surfaces (surfaces 312 and 316, respectively) of body 302. Outlet port 310 is positioned on top surface 316 of body 302, rather than side surface 314 of body 302, as shown in FIGS. 3 and 5. In FIG. 7, outlet port 310 is positioned such that it discharges exhaust stream 204 from second compartment 320 (which is a second longitudinal segment of cavity 304, in addition to first compartment 318) in a direction indicated by arrow 706 that is perpendicular to a flow of exhaust stream 106 through second compartment 320 (indicated by arrow 408). In contrast, in FIG. 3, outlet port 310 is positioned such that it discharges exhaust stream 204 from second compartment 320 in a direction that is the same as the direction of the flow of exhaust stream 106 through second compartment 320. In FIG. 7, the extra 90 degree turn of the exhaust stream due to the position of outlet port 310 on top surface 316 of body 302 can provide for further noise reduction by exhaust silencer 700 as compared to exhaust silencer 300 of FIG. 3.

Second collar 702 is mounted to top surface 316 of body 302 as an additional outlet tube for outlet port 310. As shown in FIG. 8, second collar 702 may be round in shape. However, second collar 702 may have other shapes, including rectangular, etc. As shown in FIGS. 7 and 8, inlet port 308 and outlet port 310 (and thus first collar 506 and second collar 702) may be positioned coaxially on opposite sides of body 302, although this is not necessary.

Mounting assembly 704 is used to provide mounting stability for exhaust silencer 700 on surface 510 (in addition to the mount provided by first collar 506). In the example of FIGS. 7 and 8, mounting assembly 704 includes a pair of mounts 708a and 708b, which are attached (e.g., screwed, riveted, bolted, and/or welded) to body 302. Mounts 708a and 708b have respective through-holes 710a and 710b. Mounting assembly 704 further includes a pair of I-bolts 712 (only one I-bolt is visible in FIG. 7), which respectively pass through through-holes 710a and 710b and screw into surface 510 to mount exhaust silencer 700 to surface 510. In alternative embodiments, mounting assembly may include other types and/or numbers of mounting elements, as needed for a particular application.

FIGS. 7 and 8 show various example dimensions for exhaust silencer 700, including a width 714 of second collar 702, a distance 716 between an edge of second collar 702 and surface 314 of body 302, a height 718 of first collar 506, a distance 802 between centers of through-holes 710a and 710b, a longitudinal distance 804 between a center of through-hole 710b and a center of second collar 702, a latitudinal distance 806 between a side surface of body 302 and the center of second collar 702. These dimensions can have a variety of values, depending on the particular application of exhaust silencer 700. For example, in an embodiment, width 714 may be 10⅛ (ten and one-eighth) inches, distance 716 may be 2 inches, height 718 may be 6 inches, distance 802 may be 25¾ (twenty-five and three-quarter) inches, distance 804 may be 38 inches, and distance 806 may be 11½ (eleven and one-half) inches. Furthermore, through-holes 710a and 710b may have example diameters of ¾ (three-quarters) of an inch. Still further, the dimensional values provided above for exhaust silencer 500 can be applied to exhaust silencer 700.

Note that the example dimensions described above may be varied as required for a particular application based on a variety of factors, including a pressure of exhaust stream 106, a temperature of exhaust stream 106, a size of microturbine 102, etc.

Figure 9:
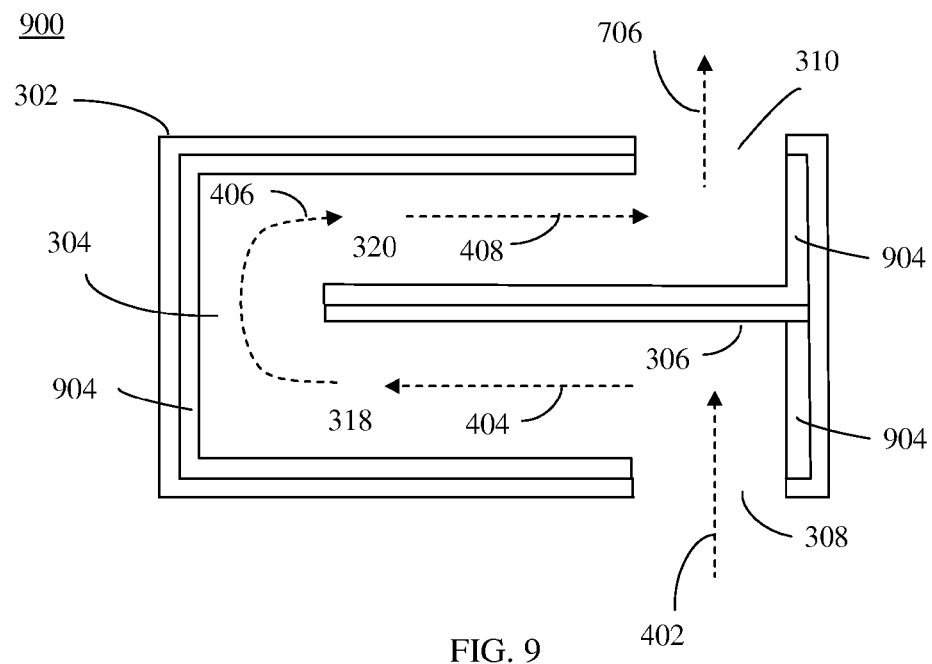
FIGS. 9 and 10 show example exhaust silencers, according to embodiments of the present invention.

FIG. 9 shows a cross-sectional view of an exhaust silencer 900, which is a further example of exhaust silencer 202 shown in FIG. 2, according to an embodiment of the present invention. Body 902 of exhaust silencer 900 in FIG. 9 is similar to body 302 of exhaust silencer 700 shown in FIG. 7, except a layer 904 of material lines/covers an inner surface of cavity 304 and a top surface of baffle plate 306. In embodiments, the material of layer 904 is a heat resistant material and/or a sound absorbing material. When a heat resistant material is used for layer 904, the heat resistant material aids exhaust silencer 900 in withstanding a heat of exhaust stream 106 passing through cavity 304. Exhaust stream 106 entering exhaust silencer 900 may have a temperature of 700 degrees F., for example. Thus, the heat resistant material is selected to be able to withstand such temperatures. When a sound absorbing material is used for layer 904, the sound absorbing material further aids exhaust silencer 900 in reducing noise generated by microturbine 102.

The material of layer 904 can be any suitable heat resistant and/or sound absorbing material. For example, in an embodiment, layer 904 may be an aluminum foam. Aluminum foam typically is sound absorbing, and in an example embodiment, may be heat resistant to 1000 degrees F.

Any portion of cavity 304 and/or baffle plate 306 may be lined/covered by layer 904. For example, as shown in FIG. 9, a top surface of baffle plate 306 is covered by layer 904, but a bottom surface of baffle plate 306 is not covered by layer 904. This configuration may be used because an exhaust stream flowing into cavity 304 from inlet port 308 will be at the greatest temperature and greatest pressure, and baffle plate 306 may be better able to withstand the heat and pressure, rather than layer 904. Furthermore, having layer 904 on the bottom surface of baffle plate 306 may interfere with the noise reduction characteristics of baffle plate 306. Alternatively, however, in an embodiment, layer 904 may cover the bottom surface of baffle plate 306.

Figure 10:
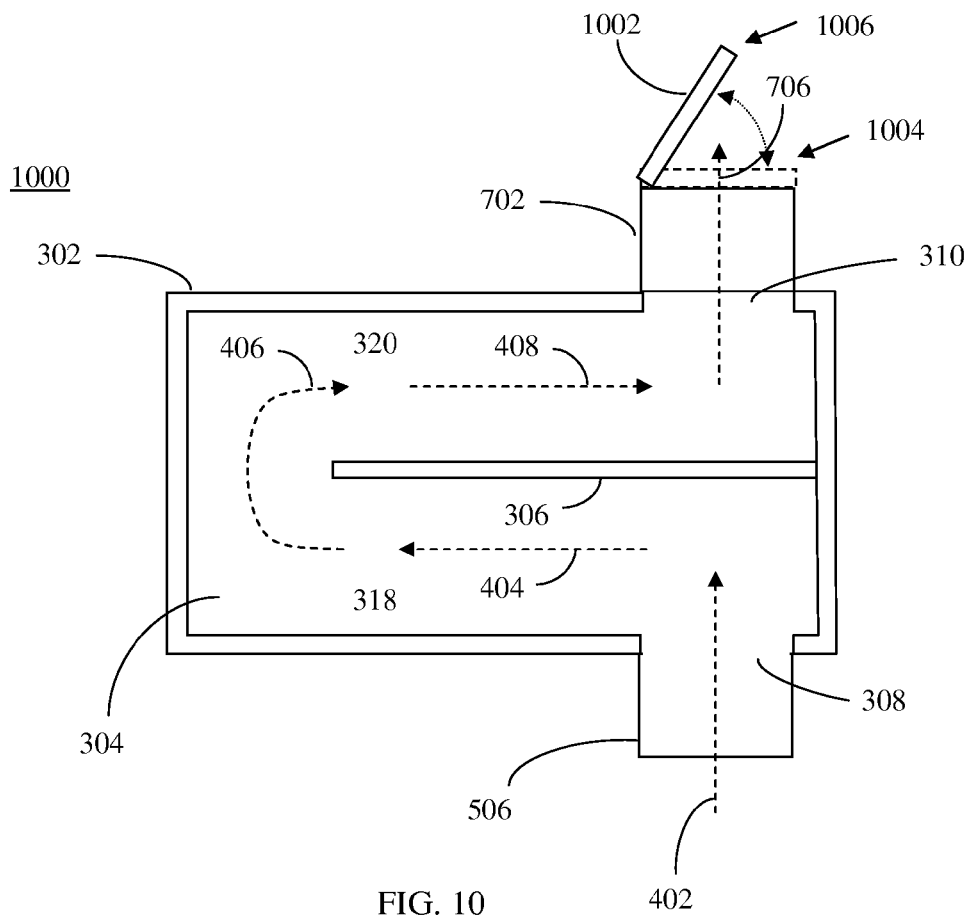

FIG. 10 shows a cross-sectional view of an exhaust silencer 1000, which is a further example of exhaust silencer 202 shown in FIG. 2, according to an embodiment of the present invention. Exhaust silencer 1000 in FIG. 10 is similar to exhaust silencer 700 shown in FIG. 7, except that exhaust silencer 1000 includes a cover 1002 for a top opening of second collar 702. As shown in FIG. 10, cover 1002 can move between a first position 1004 and a second position 1006 (shown by dotted lines in FIG. 10). In first position 1004, cover 1002 blocks outlet port 310 (e.g., by blocking an opening of second collar 702). First position 1004 for cover 1002 provides for environmental protection for exhaust silencer 1000, by blocking environmental elements from entering outlet port 310, such as rain, snow, birds, insects, etc. In second position 1006, cover 1002 does not block outlet port 310. Thus, in second position 1006, outlet port 310 is able to discharge exhaust stream 204 along the direction of arrow 706.

Note that in embodiments, cover 1002 may be automatically (e.g., electrically, by computer instruction, etc.) or manually controlled to move between first and second positions 1004 and 1006. Alternatively, cover 1002 may be configured to move between first and second positions 1004 and 1006 due to a pressure of exhaust stream 204 being discharged from outlet port 310. For example, cover 1002 may be weighted to be capable of being moved/positioned by the exhaust stream.

Note that features of the various exhaust silencers described above can be combined in any manner, as desired for a particular application.

Figure 11:
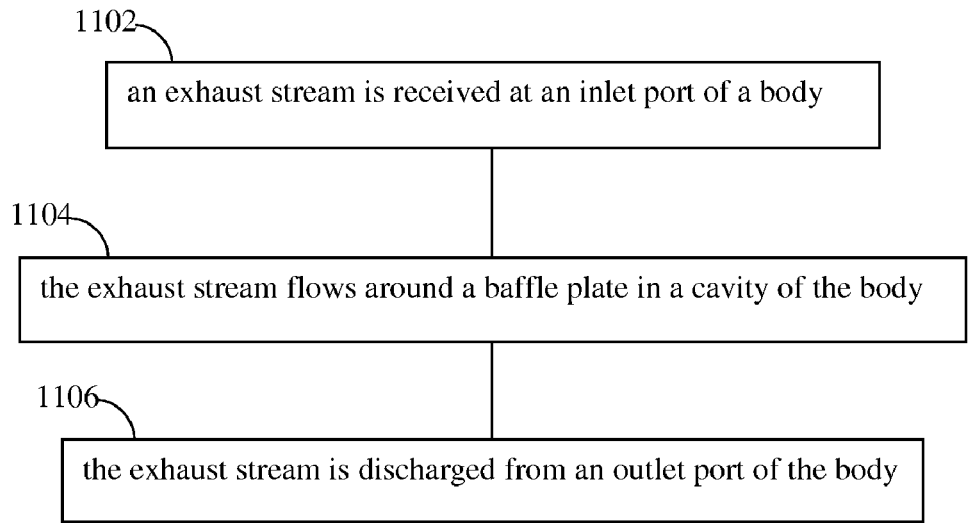
FIG. 11 shows a flowchart for operation of an exhaust silencer, according to an embodiment of the present invention.

FIG. 11 shows a flowchart 100 providing example steps for silencing an engine, according to example embodiments of the present invention. For example, the exhaust silencers described above can be used to perform flowchart 1100. Flowchart 1100 is described as follows. Other structural and operational embodiments will be apparent to persons skilled in the relevant art(s) based on the following discussion.

Flowchart 1100 begins with step 1102. In step 1102, an exhaust stream is received at an inlet port of a body. For example, as shown in FIG. 3, exhaust stream 106 is received at inlet port 308 of body 302 of exhaust silencer 300. In a similar fashion, exhaust silencers 500, 700, 900, and 1000 receive exhaust stream 106 along arrow 402 at inlet port 308.

In step 1104, the exhaust stream flows around a baffle plate in a cavity of the body. For example, as shown in FIG. 4, exhaust stream 106 flows along the direction of arrows 402, 404, 406, 408, and 410, around baffle plate 306 of exhaust silencer 300. In a similar fashion, exhaust stream 106 flows along the direction of arrows 402, 404, 406, 408, and 410, around baffle plate 306 for exhaust silencers 500, 700, 900, and 1000. Flowing around baffle plate 306 in cavity 304 reduces noise content for an exhaust stream.

In step 1106, the exhaust stream is discharged from an outlet port of the body. For example, as shown in FIG. 3, exhaust stream 204 is discharged from outlet port 310 of body 302 of exhaust silencer 300. In a similar fashion, exhaust silencers 500, 700, 900, and 1000 discharge exhaust stream 204 along arrow 410 from outlet port 310.

According to flowchart 1100, noise produced by an engine, such as a microturbine, is reduced. Additional steps may be performed during flowchart 1100, according to the teachings provided herein, as would be known to persons skilled in the relevant art(s).

Figure 12:
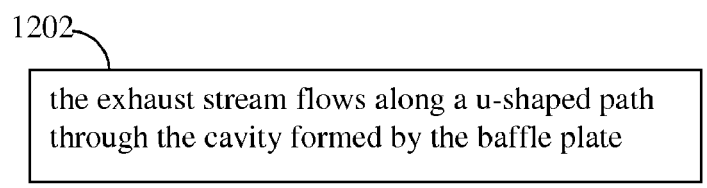
FIGS. 12 and 13 show example steps that may be implemented in the flowchart of FIG. 11, according to embodiments of the present invention.

For instance, FIG. 12 shows a step 1202 that may be performed during step 1104 of flowchart 1104. In step 1202, the exhaust stream flows along a u-shaped path through the cavity formed by the baffle plate. For example, as shown for exhaust silencers 300, 500, 700, 900, and 1000, baffle plate 306 creates a u-shaped path for flow of an exhaust stream. As described above, an exhaust silencer may have alternative and/or additional turns other than the u-shaped turn due to baffle plate 306.

Figure 13:
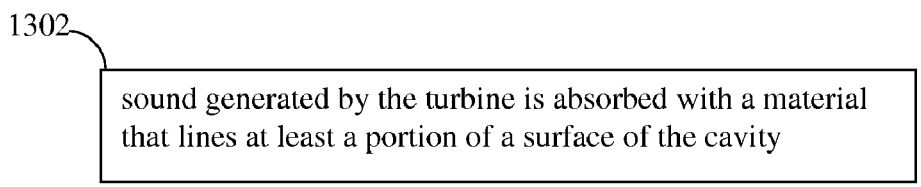

FIG. 13 shows a step 1302 that may be performed in flowchart 1100. In step 1302, sound generated by the turbine is absorbed with a material that lines at least a portion of a surface of the cavity. For example, as described above with respect to FIG. 9, a layer 904 of material may line/cover an inner surface of cavity 304 and a surface of baffle plate 306. The material of layer 904 may absorb sound and/or may be heat resistant. Any portion of cavity 304 and/or baffle plate 306 may be lined/covered by the material.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An exhaust silencer, comprising:
   a body;
   a cavity in the body;
   a baffle plate that partially divides the cavity to form first and second longitudinal compartments in the body, wherein the baffle plate is solid and planar;
   a heat resistant material that covers at least a portion of a surface of the cavity;
   an inlet port formed in a first surface of the body at a first end of the first longitudinal compartment;
   an outlet port formed in a second surface of the body at a first end of the second longitudinal compartment;
   a stationary discharge hood that projects out from the second surface of the body to partially cover the outlet port;
   a tube shaped collar on the first surface of the body coupled to the inlet port; and
   an opening that connects the first and second longitudinal compartments at a second end of the first longitudinal compartment and a second end of the second longitudinal compartment such that the cavity is u-shaped, the u-shaped cavity being formed by the opening, the first longitudinal compartment, and the second longitudinal compartment;

wherein the inlet port is configured to receive an exhaust stream that flows into contact with the baffle plate, through the cavity, and around the baffle plate;

wherein the collar is configured to mate the exhaust silencer with a source of the exhaust stream; and wherein the outlet port is configured to discharge the exhaust stream from the body into the environment, the discharge hood being configured to protect the outlet port from environmental elements.

2. The exhaust silencer of claim 1, wherein the inlet port is positioned such that the inlet port infuses the exhaust stream into the first longitudinal compartment in a direction that is perpendicular to a flow of the exhaust stream through the first longitudinal compartment.

3. The exhaust silencer of claim 2, wherein the outlet port is positioned such that the outlet port discharges the exhaust stream from the second longitudinal compartment in a direction of a flow of the exhaust stream through the second longitudinal compartment.

4. The exhaust silencer of claim 1, wherein the body is a rectangular metal structure.

5. The exhaust silencer of claim 1, wherein the heat resistant material is an aluminum foam material.

6. The exhaust silencer of claim 1, further comprising:
an aluminum foam material that covers at least a portion of the baffle plate.

7. A turbine system, comprising:
a microturbine having an exhaust port; and
an exhaust silencer coupled to the exhaust port;
wherein the exhaust silencer comprises:
a body,
a cavity in the body,
a baffle plate that partially divides the cavity to form first and second longitudinal compartments in the body, wherein the baffle plate is solid and planar;
an inlet port formed in a first surface of the body at a first end of the first longitudinal compartment,
an outlet port formed in a second surface of the body at a first end of the second longitudinal compartment,
a first collar on the first surface of the body coupled to the inlet port,
a second collar on the second surface of the body coupled to the outlet port,
a cover coupled to the second collar having a first position and a second position, wherein the cover blocks the second collar in the first position and rotates away from the body in the second position to not block the second collar, and
an opening that connects the first and second longitudinal compartments at a second end of the first longitudinal compartment and a second end of the second longitudinal compartment such that the cavity is u-shaped, the u-shaped cavity being formed by the opening, the first longitudinal compartment, and the second longitudinal compartment;
wherein the inlet port is configured to receive an exhaust stream from the exhaust port such that the exhaust stream flows into contact with the baffle plate, through the cavity, and around the baffle plate;
wherein the first collar is configured to mate the exhaust silencer with the exhaust port of the microturbine; and
wherein the outlet port is configured to discharge the exhaust stream from the body into the environment when the cover is in the second position.

8. The turbine system of claim 7, further comprising:
a sound absorbing and heat resistant material that covers at least a portion of a surface of the cavity.

9. A method for silencing a turbine, comprising:
receiving an exhaust stream from the turbine through a tube shaped collar at an inlet port at a first end of a first longitudinal compartment of a u-shaped cavity of a body;
flowing the exhaust stream through the first longitudinal compartment of the u-shaped cavity of the body, into contact with a solid and planar baffle plate in the u-shaped cavity of the body, around the baffle plate, through a second longitudinal compartment of the u-shaped cavity in the body, and across a heat resistant material that covers at least a portion of a surface of the u-shaped cavity; and
discharging the exhaust stream into the environment from an outlet port of the body at a first end of the second longitudinal compartment past a stationary discharge hood that projects out from an external surface of the body and partially covers the outlet port, the discharge hood protecting the outlet port from environmental elements.

10. The method of claim 9, further comprising:
absorbing sound generated by the turbine with a material that lines at least a portion of a surface of the cavity.

11. An exhaust silencer, comprising:
a body;
a cavity in the body;
a baffle plate that partially divides the cavity to form first and second longitudinal compartments in the body, wherein the baffle plate is solid and planar;
an inlet port formed in a first surface of the body at a first end of the first longitudinal compartment;
an outlet port formed in a second surface of the body at a first end of the second longitudinal compartment;
an opening that connects the first and second longitudinal compartments at a second end of the first longitudinal compartment and a second end of the second longitudinal compartment such that the cavity is u-shaped, the u-shaped cavity being formed by the opening, the first longitudinal compartment, and the second longitudinal compartment;
a first collar on the first surface of the body coupled to the inlet port;
a second collar on the second surface of the body coupled to the outlet port;
a cover coupled to the second collar having a first position and a second position, wherein the cover blocks the second collar in the first position and rotates away from the body in the second position to not block the second collar; and
a sound absorbing material that covers at least a portion of a surface of the cavity;
wherein the inlet port is configured to receive an exhaust stream through the first collar that flows into contact with the baffle plate, through the cavity, and around the baffle plate;
wherein the first collar is configured to mate the exhaust silencer with a source of the exhaust stream; and
wherein the outlet port is configured to discharge the exhaust stream from the body into the environment when the cover is in the second position.

12. The exhaust silencer of claim 7, wherein the inlet port and the outlet port are positioned coaxially on opposite sides of the body.

13. The exhaust silencer of claim 1, wherein the baffle plate has a thickness substantially equal to or less than 1 inch.

14. The turbine system of claim 7, wherein the baffle plate has a thickness substantially equal to or less than 1 inch.

15. The method of claim 9, wherein the baffle plate has a thickness substantially equal to or less than 1 inch, wherein said flowing comprises:

flowing the exhaust stream around the solid and planar baffle plate having the thickness substantially equal to or less than 1.

16. The exhaust silencer of claim 11, wherein the baffle plate has a thickness substantially equal to or less than 1 inch.

* * * * *